United States Patent [19]

Hayashi

[11] Patent Number: 4,880,375

[45] Date of Patent: Nov. 14, 1989

[54] APPARATUS FOR STRETCHING A PLASTIC RAW MATERIAL

[75] Inventor: Torahiko Hayashi, Tochigi, Japan

[73] Assignee: Rheon Automatic Machinery Co., Ltd., Japan

[21] Appl. No.: 214,882

[22] Filed: Jul. 1, 1988

Related U.S. Application Data

[63] Continuation-in-part of Ser. No. 928,633, Nov. 5, 1986, abandoned, which is a continuation of Ser. No. 752,992, Jul. 8, 1985, abandoned.

[30] Foreign Application Priority Data

Jul. 7, 1984 [JP] Japan .................................. 59-141084

[51] Int. Cl.<sup>4</sup> ............................................... A21C 3/02
[52] U.S. Cl. .................................... 425/335; 425/363; 425/364 R; 425/367; 425/372; 426/517
[58] Field of Search ................. 425/92, 101, 238, 332, 425/335, 337, 363, 364 R, 367, 371, 372, 373, 374, 505, 583; 426/502, 504, 517

[56] References Cited

U.S. PATENT DOCUMENTS 3,753,638  8/1973  Simpson ........................... 425/363
3,973,895  8/1976  Hayashi ............................ 425/372
4,113,412  9/1978  Hayashi ............................ 425/335
4,178,147 12/1979  Hayashi ............................ 425/372
4,192,636  3/1980  Hayashi et al. ...................... 425/96
4,266,920  5/1981  Hayashi et al. .................. 425/133.1
4,421,776 12/1983  Brinkers et al. ................... 425/373
4,671,760  6/1987  Hayashi ............................ 425/372

FOREIGN PATENT DOCUMENTS 0084509  7/1983  European Pat. Off. ............. 425/372
 128015 12/1984  European Pat. Off. ............. 425/371
 211669  2/1987  European Pat. Off. ............. 425/372
1472177  5/1977  United Kingdom ................. 425/363

Primary Examiner—Jay H. Woo
Assistant Examiner—C. Scott Bushey
Attorney, Agent, or Firm—Guy W. Shoup; Paul J. Winters

[57] ABSTRACT

An apparatus for stretching a plastic raw material such as bread dough. By providing a plurality of conveying assemblies which is adapted to be driven at respective different speeds and driven forwardly or backwardly, and a roller mechansim positioned above the conveying assemblies, an effective stretching of the plastic material fed between the rollers of the roller mechanism and the conveying path of the conveying assemblies is performed. The plastic material is fed from either direction of the conveying path to simply repeat the stretching operation.

3 Claims, 5 Drawing Sheets

APPARATUS FOR STRETCHING A PLASTIC RAW MATERIAL

This application is a continuation-in-part of U.S. Ser. No. 928,633, filed Nov. 5, 1986, now abandoned, which was a continuation of U.S. Ser. No. 752,992, filed July 8, 1985, now abandoned.

BACKGROUND OF THE INVENTION

1. Field of the Invention

This invention relates to an apparatus for stretching a plastic raw material such as bread dough, confectionery dough or any other material. More particularly, it relates to such apparatus whereby an effective stretching of the plastic raw material can be achieved by moving it past the apparatus and the stretching can be repeated by reversing the direction of movement of the dough to be stretched.

2. Description of the Prior Art

In the past, when thick dough was to be rolled into a thin dough strip in a dough stretching operation, a pair of opposing rollers have been rotated in reverse directions so that they move in the same direction as that of movement of dough where it comes into contact with the rolls, thereby imparting a stretching pressure to the dough. Such a process squeezes the dough. However, squeezing by merely imparting a stretching pressure as described above is not so effective for achieving the purpose of stretching viscoelastic material such as dough, because the squeezing pressure causes turbulent flows of dough resulting in an uneven tissue of the dough.

Another prior art apparatus has been such that dough is placed on conveying devices which are driven at different speeds, and rollers disposed thereabove for rotation along an orbit and revolution on their own axes make rolling movement in the traveling direction of the conveying devices where the dough touches the rollers, thereby stretching the dough. Such an apparatus obviates the difficulties encountered in the use of the above-mentioned pair of rollers. However, in such an apparatus, dough is conveyed in one direction only.

In contrast to such prior art apparatus, this invention provides an apparatus where dough can be supplied in two directions so that the dough can be repeatedly stretched back and forth to conveniently achieve a high stretching effect.

SUMMARY OF THE INVENTION

It is an object of the present invention to provide an apparatus for stretching a plastic raw material in a relatively simple operation. It is another object of the present invention to provide an apparatus for effectively stretching the plastic material having viscoelasticity (hereinafter referred to as dough) to obtain a high compression ratio by a simple operation. A further object of the present invention is to provide a dough stretcher apparatus where the movement of the dough to be stretched can be reversed to be subjected to repeated stretching using the same apparatus. A still further object of the invention is to provide a dough stretching apparatus which can multiply the number of layers of a multilayered dough sheet while stretching it.

In one aspect of the present invention, an apparatus for stretching the dough is provided, comprising a plurality of conveyors arranged in series and adapted to be driven at different speeds and forwardly or backwardly in unison, and a roller mechanism positioned above the plurality of conveyors which comprises a plurality of rollers freely rotatable about their axes and movable along an endless path, the peripheries of the moving rollers forming a closed envelope having a lower straight portion spaced, by a predetermined clearance, apart from and above the conveying portion of the plurality of conveyors, thereby enabling the feeding of the dough from either direction of the conveying path to stretch the same.

In another aspect of the present invention, an apparatus for stretching the dough is provided, in which the dough is effectively stretched by being fed forwardly and backwardly from either direction of the conveyance path while an angle is made between the lower straight portion of a roller mechanism and the conveyance path of a plurality of conveyors.

BRIEF DESCRIPTION OF THE DRAWINGS

FIG. 1 (B) is an enlarged elevation view of a portion of the embodiment showing a clearance H between a roller path and a conveying path shown in FIG. 1(A).

DESCRIPTION OF THE PREFERRED EMBODIMENTS

Figure 1A:
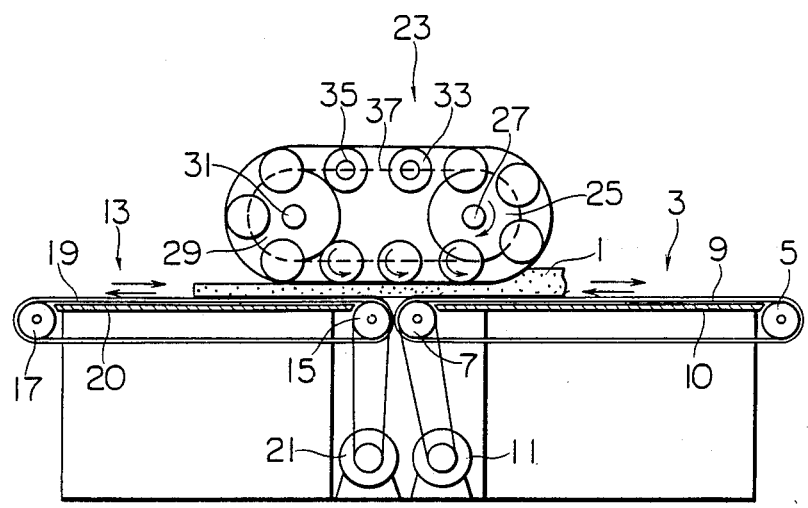
FIG. 1 (A) is a side elevation view of an embodiment of the present invention.

The present invention comprises a plurality of conveying devices driven at different speeds and arranged in series, those conveying devices being capable of conveying forwardly and backwardly in the conveyance direction, and a roller mechanism positioned above the plurality of conveying devices and adapted to rotate around their axes and to move along an endless roller path. Dough is supplied between the conveying devices and the roller mechanism. Dough can be fed from either end of the conveying path so as simply to repeat a stretching operation.

An embodiment of the present invention will now be described. A first conveyor 3 and a second conveyor 13 functioning as conveying device are arranged in series to provide a conveying surface for dough 1. The first and second conveyors 3 and 13 are driven by motors 11 and 21, respectively. The motors can reverse the direction of rotation so that the conveyors can travel forwardly and backwardly. Belts 9 and 19 pass around rollers 5 and 17, respectively, and over belt support plates 10 and 20, respectively. When the first and second conveyors 3 and 13 are driven in one direction, the relation between their speeds may be so selected that the speed of the first conveyor 3 is lower than that of the second conveyor 13, while, when they are driven in the other direction, the relation between their speeds may be so selected that the speed of the first conveyor 3 is higher than that of the second conveyor 13. The roller mechanism 23 is positioned above the conveyors and includes a plurality of rollers 33. Each of the rollers 33 is freely mounted on a shaft 35. A chain 37 extends under tension between sprockets 25 and 29 mounted on shafts 27 and 31, respectively, which shafts are in turn mounted to the frame 39 of the apparatus. Since the shafts 35 are fixed to the chain 37, the shafts 35 travel with the movement of the chain 37, and the rollers 33 also travel together with the chain 37. The speed of movement of the chain 37, and consequently the rollers 33, is usually set to be much faster than the speed of either of the conveyors 3 and 13. Rails 47 may be mounted to the frame 39 of the apparatus on either side of the conveying surface.

Figure 4:
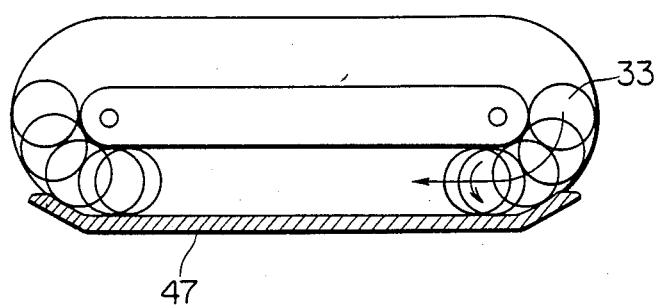
FIG. 4 is a partly sectional view of a roller mechanism of the embodiment shown in FIG. 1.
Figure 5:
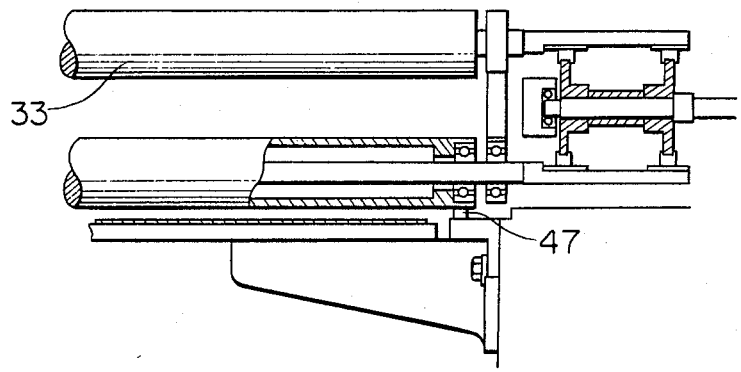
FIG. 5 is an enlarged partly sectional view of the roller mechanism of the embodiment shown in FIG. 1.

The rollers 33 revolve around their axes while they roll on rails 47 as shown in FIGS. 4 and 5. The frictional engagement of the rollers 33 with the rails 47 defines the speed of rotation of the rollers about their axes.

Figure 1B:
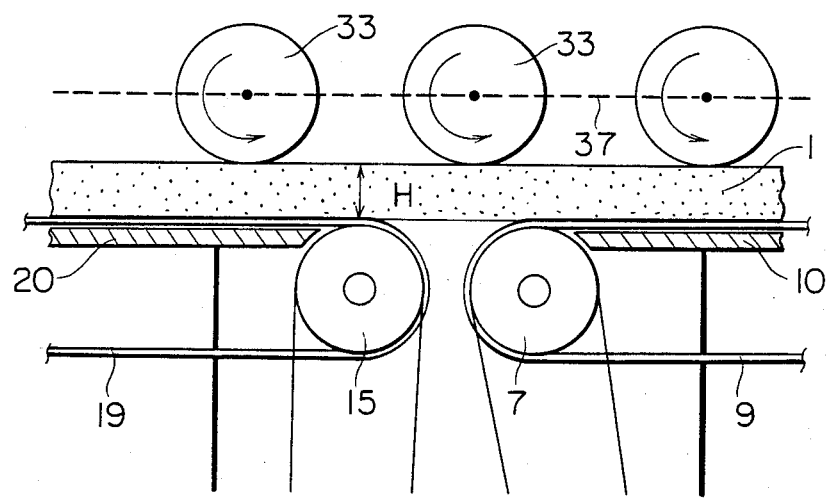
Figure 2:
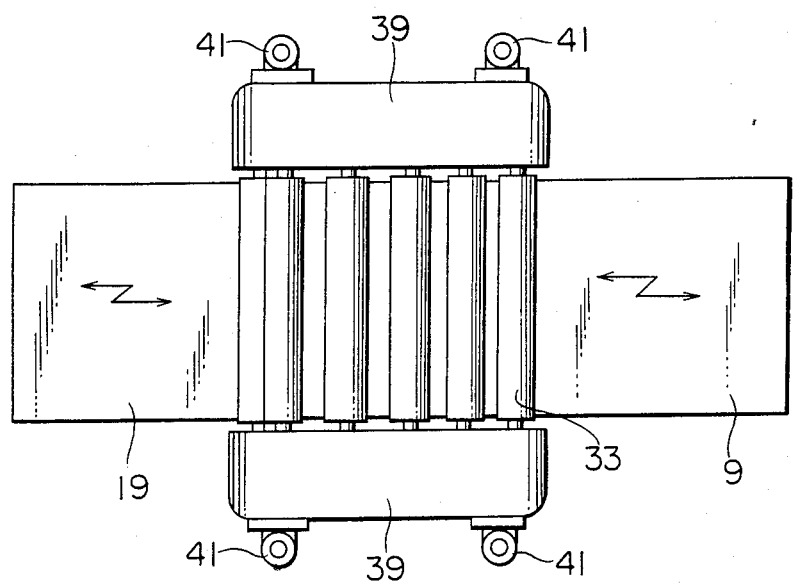
FIG. 2 is a plan view of the embodiment shown in FIG. 1.

The clearance H between the roller mechanism 23 and the conveyance path of the conveyors 3 and 13 shown in FIG. 1 (B) can be changed in response to the thickness of the dough 1 to be stretched. In order to attain this purpose, vertical lifts 41 are fixed to the frame 39 which support the roller mechanism 23. The lifts 41 can be operated to raise or lower the roller mechanism 23. The operation and effect of the present invention will now be described. When the conveying devices are driven forwardly, the relation between their speeds is such that the speed of the first conveyor 3 is lower than that of the second conveyor 13. Therefore, as shown in FIG. 1 a body of dough 1 of a certain length is placed on the conveyor 3 and is conveyed to the zone beneath a lower straight portion of the roller mechanism 23. During transfer onto the second conveyor 13, the dough 1 is stretched by a stretching force based on the speed difference between the conveyor 3 and 13, and, concurrently, by a rolling pressure imparted from the rollers 33. When the rear end of the dough 1 has passed the roller mechanism 23, the movement of the conveyors 3 and 13 is stopped and the roller mechanism 23 lowered to decrease the clearance H. The direction of movement of the conveyors 3 and 13 is reversed by reversing the direction of rotation of the motors 11 and 21, while the speed of the first conveyor 3 is made to be faster than that of the second conveyor 13. The reverserotation of the motors 11 and 21 can be attained by using any known devices, for instance, by using rotation reversible motors. These adjustments will cause the dough 1 to travel in the reverse direction and to be stretched by the stretching force based on the speed difference between the conveyors 3 and 13, and, concurrently, again by the rolling pressure imparted from the rollers 33, regardless of the moving direction of the rollers 33 along the endless roller path, whereby the dough 1 becomes thin. Thus, a single and simple apparatus can exhibit a high stretching effect by repeating a stretching operation alternately in the forward and backward directions.

The roller mechanism 23 in the present invention can impart the rolling pressure to the dough 1 regardless of the rotation direction of rollers 33, because the speed of the linear movement of the rollers 33 along the conveying path is usually faster than the speed of either of the conveyors 3 and 13 and, because of this speed difference, rollers 33 are made to revolve about their axes always in the same direction whether or not the conveyor movement is reversed, and, therefore, the working relationship between the rollers 33 and the conveyors 3 and 13 is not changed, except that the relative speed of revolution of the rollers about their axes may change. No tangential strain or, a very little occurs in the dough due to the rotation of the rollers 33 around their axes and movement along the roller path of rollers 33. This fact can also be observed even when the rail 47 is omitted to cause the rollers 33 to rotate by the friction with the dough 1. The use of the rails 47 is preferable, but they may be dispensed with. If they are not used, the rollers 33 rotate about their axes at a speed defined by the friction caused by their contact with the dough surface.

Figure 3:
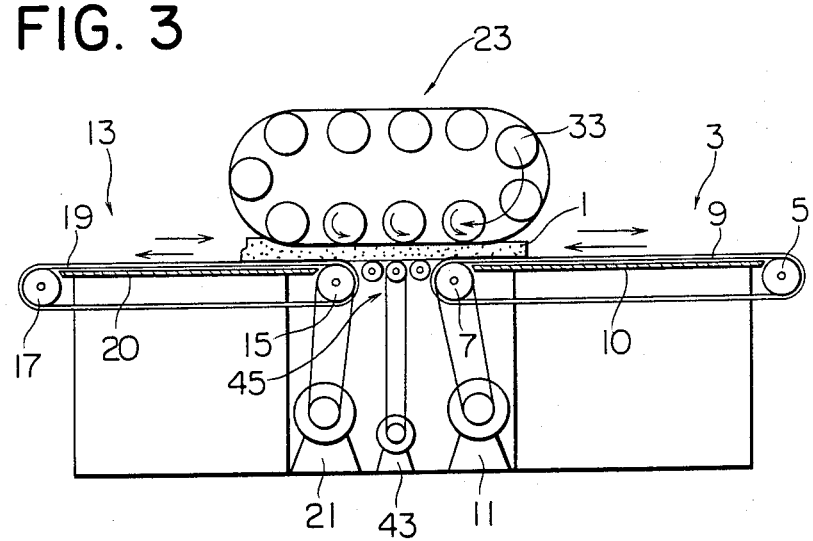
FIG. 3 is side elevation view of another embodiment of the present invention.

As shown in FIG. 3, the apparatus of the present invention can provide a plurality of rollers 45 as a conveying device. The rollers 45 are driven by a motor 43 at a speed higher than that of the conveyor 3 and lower than that of the conveyor 13 when the conveyors are driven forwardly. Similarly, when the conveyors are driven backwardly, the rollers 45 are driven reversely at a speed higher than that of the conveyor 13 and lower than that of the conveyor 3, and the same stretching effect as that in the embodiment shown in FIG. 1(A) is obtained.

Figure 6:
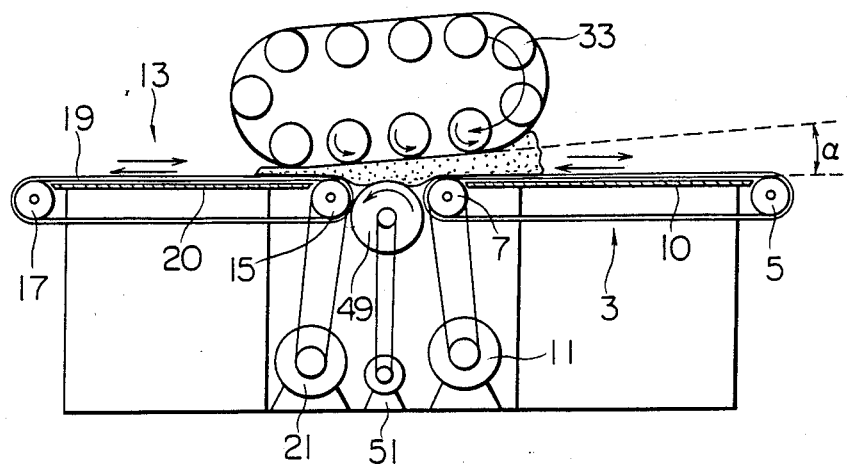
FIG. 6 is a side elevation view of still another embodiment of the present invention.
Figure 7:
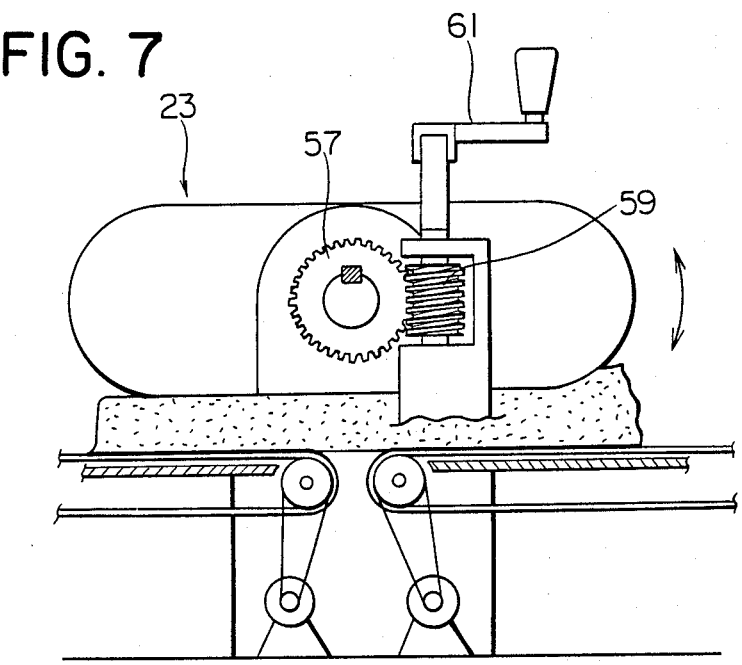
FIG. 7 is a side elevation view showing a worm gearing to incline the roller mechanism of the present invention.

Further, a high stretching effect can be obtained when the roller mechanism 23 is inclined to make a predetermined angle $\alpha$ with respect to the conveyance path of the conveyors, as shown in FIG. 6. This inclination can be made by, for instance, a worm gearing comprising a worm 59, a worm gear 57, and a handle 61, as shown in FIG. 7.

If the angle $\alpha$ is provided, a dough mass or sheet of a greater thickness may be fed into the gap between the roller mechanism 23 and the conveyors. The speed of rotation of each conveyor may also be adjusted so that a downstream conveyor can travel at a speed ratio greater than when the roller mechanism 23 and the conveyors are parallel. Thus, the stretching capacity of the apparatus will increase accordingly. When a body of dough mass or sheet is stretched once, the roller mechanism may be made to take a position where the inclination is reversed. The dough may be folded to increase its thickness and is fed into the gap under the roller mechanism 23, repeating the stretching operation in the reverse direction upon readjusting the direction of movement of the conveyors and the relative speed of each conveyor. If the dough to be stretched is multilayered such as one where dough layers are alternately interposed with layers of butter or margarine, the repeated stretching and folding operation will effectively increase the layers.

Furthermore, the same effect can be performed by independently adjusting the level of the conveyance path of each conveyor.

Figure 8:
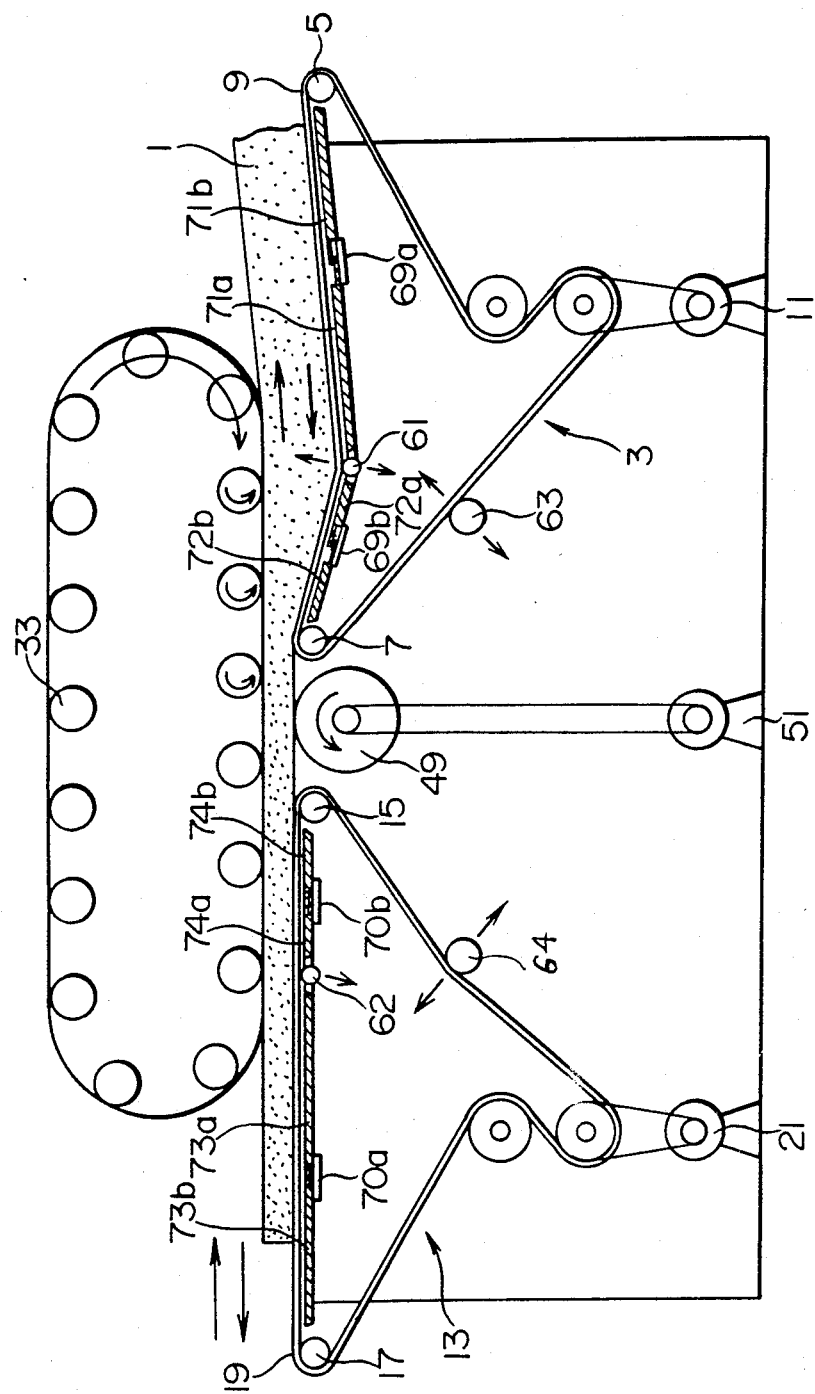
FIG. 8 is a side elevation view of still another embodiment of the present invention.

FIG. 8 shows another embodiment of this invention in which the space between the straight lower portion of the rollers (33) and the conveying path can be adjusted. All the members correspond to the members in FIG. 6, and have the same reference numbers, and the construction of the apparatus is substantially the same as that of the apparatus in FIG. 6, except for the hinge links (61, 62), tension controllers (63, 64), and belt support plate assemblies. In this embodiment the belt support plate (10, in FIG. 1) is replaced by a belt support assembly consisting of two plates connected by the hinge link (61) at the area adjacent the inlet to the space between the straight lower portion of the rollers (33)

and the first conveyor. The hinge links (61) are arranged so that they can move up and down. Each of the two plates includes a first and second half part (71a, 71b, 72a, 72b) connected by sliding holder plates (69a, 69b). When the link (61) is lowered, the first parts (71a, 72a) slideably move along the sliding holder plates (69a, 69b) so that the plates can be extended. The belt support plate (20, in FIG. 1) of the first embodiment is also replaced by a belt support assembly consisting of two plates having first and second half parts (73a, 73b, 74a, 74b) connected by sliding holder plates (70a, 70b) and a similar hinge (62) in the similar manner as the case of the first mentioned plates (71a, 71b, 72a, 72b). The belt support assembly can be aligned in a straight line or the two plates can be at an angle with each other, depending on the vertical position of the hinge link (62).

In operation, when the hinge link (61 or 62) is lowered and a thick dough mass is provided at the inlet, the belt is pushed down by the weight of the dough mass and thus a space wide enough to pass the dough mass is provided at the inlet as shown in FIG. 8. Since the rollers (5, 7) are fixed in position, the two plates consisting of the half parts (71a, 71b, 72a, 72b) extend when the hinge link (61) is lowered. Similarly, when the hinge link (62) is lowered, a space wide enough to pass a thick dough mass is provided at the inlet of the space above the conveyor belt (19) so that the dough can be fed in the reverse direction. The two plates consisting of the half parts (73a, 73b, 74a, 74b) extend and the plates (71a, 71b, 72a, 72b) are straightened during the reverse feeding operation.

To provide proper tension to the belt of the first and second conveyors (3, 13), tension controllers (63, 64) are provided on the frame of the apparatus. The belts (3, 13) should be long enough to accommodate the extension of the plates. Accordingly, when the hinge link (61, or 62) moves up and thus the plates are aligned in a straight line and are shortened, the belt becomes loose. Therefore, the position of the tension controller (63 or 64) is adjusted to push the belt so that proper tension is provided to the belt (3 or 13). In FIG. 8, the tension controller (64) is positioned so that a proper tension is provided on the belt (13), while the tension controller (63) is positioned to allow the belt to follow the extended plates. The positions of the tension controllers (63, 64) may be manually adjusted by the operator when the hinge links (61, 62) are moved up or down. However, the tension controllers (63, 64) may be constructed so that they are automatically adjusted in response to the movement of the hinge links (61, 62).

In this embodiment, a thick dough mass can be readily inserted into the space between the roller assembly and the conveyors by lowering the hinge link.

As in the embodiment of FIG. 6, the repeated stretching operation is conducted.

I claim:

1. An apparatus for stretching a plastic raw material, comprising:

at least two conveyors arranged in series having respective conveying portions thereof forming a conveying path for plastic raw material fed onto said conveyors;

driving means for driving each of said conveyors at selected speeds and in forward and reverse directions, said driving means driving said conveyors in the same direction for each of said forward and reverse directions and such that a conveyor downstream is driven at a faster speed than a conveyor upstream in each of the respective directions, in order to provide a stretching action to the plastic raw material on said conveying path;

a roller mechanism positioned above and extending over said at least two conveyors comprising a plurality of rollers which are freely axially rotatable and movable along an endless roller path, wherein the peripheries of said rollers on said endless roller path form a closed loop having a straight lower portion which is spaced at an adjustable spacing above said conveying path of said conveyors;

reversing means for alternately reversing said driving means for driving said conveyors first in the forward direction, with the downstream conveyor driven at a faster speed than the upstream conveyor, such that plastic raw material on said conveying path is passed in the forward direction in stretching contact with said straight lower portion of said rollers on said endless roller path, and then for driving said conveyors in the reverse direction, with the downstream conveyor in the reverse direction driven faster than the upstream conveyor, to pass the plastic raw material in stretching contact with said rollers in said reverse direction; and adjusting means for adjusting the spacing of said straight lower portion of said rollers above said conveying path with each successive pass of the plastic raw material in the forward and reverse directions; and wherein said adjusting means further includes means for adjusting an angle of inclination of said straight lower portion of said rollers relative to said conveying path in each direction as the raw plastic material is fed on said conveying path in successive passes.

2. An apparatus according to claim 1, wherein the conveying portions are independently adjustable to change the spaced position of each conveyor portion with respect to said roller mechanism.

3. The apparatus for stretching a plastic raw material according to claim 1, further comprising a pair of means for inclining said conveying path, positioned at or adjacent both ends of a region where said conveying path and said straight lower portion face each other, at least one of said inclining means being at or adjacent the end where the plastic raw material is fed into the apparatus and being arranged to be lowered for inclining said conveying path.

* * * * *